United States Patent
Smart

[19]

[11] Patent Number: 5,875,999
[45] Date of Patent: Mar. 2, 1999

[54] CABLES SUSPENSION DEVICES

[75] Inventor: Thomas John Smart, Houghton on the Hill, United Kingdom

[73] Assignee: The Morgan Crucible Company plc, Windsor, United Kingdom

[21] Appl. No.: 794,914

[22] Filed: Feb. 4, 1997

[30] Foreign Application Priority Data

Feb. 9, 1996 [GB] United Kingdom .................. 9602610

[51] Int. Cl.$^6$ ........................................... F16L 3/00
[52] U.S. Cl. ................. 248/49; 248/63; 248/64; 248/67.7
[58] Field of Search .................. 248/49, 63, 64, 248/58, 61, 67.7

[56] References Cited

U.S. PATENT DOCUMENTS

| | | |
|---|---|---|
| 1,914,976 | 6/1933 | Nigro et al. . |
| 2,192,260 | 3/1940 | Fisher et al. . |
| 2,414,045 | 1/1947 | Kitselman et al. ............... 248/63 X |
| 2,421,286 | 5/1947 | Pyle .................................. 248/63 X |
| 2,643,283 | 6/1953 | Carlson ............................. 248/63 X |
| 2,650,263 | 8/1953 | Steinmayer .................. 248/67.7 X |
| 2,888,726 | 6/1959 | Smith . |
| 2,897,256 | 7/1959 | Kitsleman et al. ............... 248/63 X |
| 2,911,695 | 11/1959 | Knight et al. ..................... 248/63 X |
| 2,912,816 | 11/1959 | Kitselman . |
| 3,018,319 | 1/1962 | Quayle . |
| 3,069,491 | 12/1962 | Hayden et al. .................... 248/63 X |
| 3,117,181 | 1/1964 | Wilson .............................. 248/64 X |
| 3,127,140 | 3/1964 | Quayle .................................. 248/63 |
| 3,183,658 | 5/1965 | Peterson . |
| 3,195,338 | 7/1965 | Bram . |
| 3,260,487 | 7/1966 | Schlein ................................. 248/63 |
| 3,261,581 | 7/1966 | Little et al. ........................... 248/63 |
| 3,315,509 | 4/1967 | Barlow . |
| 3,347,980 | 10/1967 | Reese .................................. 248/63 X |
| 3,406,513 | 10/1968 | Butz et al. ......................... 248/63 X |
| 3,501,116 | 3/1970 | Eppinger et al. .................... 248/63 |
| 3,646,793 | 3/1972 | Teraoka . |
| 3,739,075 | 6/1973 | Jean et al. . |
| 3,800,397 | 4/1974 | Poffenberger . |
| 3,847,491 | 11/1974 | Poffenberger . |
| 4,546,631 | 10/1985 | Eisinger . |
| 4,960,266 | 10/1990 | McDowell et al. . |
| 5,105,642 | 4/1992 | Mohr . |
| 5,217,207 | 6/1993 | Schmader et al. . |
| 5,586,461 | 12/1996 | Murphy . |

FOREIGN PATENT DOCUMENTS

| | | |
|---|---|---|
| 42334/72 | 4/1973 | Australia . |
| 706920 | 7/1931 | France . |
| 1 976 248 | 11/1967 | Germany . |
| 714317 | 8/1954 | United Kingdom . |
| 1135432 | 12/1968 | United Kingdom . |
| WO 96/14176 | 5/1976 | WIPO . |

OTHER PUBLICATIONS

Böhme, Ralph, et al., "144 Fiber All Dielectric Aerial Cable for Railway Applications," Kabel Rheydt AG, published at the International Wire and Cable Symposium, Mönchengladbach, Germany (1996).

Siemens Catalogue, "Advantages in the Air. The fiber optic aerial cable from Siemens" (undated).

*Primary Examiner*—Ramon O. Ramirez
*Assistant Examiner*—Long Dinh Phan
*Attorney, Agent, or Firm*—Dean W. Russell; Kilpatrick Stockton LLP

[57] ABSTRACT

A cable suspension clamp is provided comprising a roller capable in use of rotating as a cable is drawn across it, and securing means comprising a length of material having a central locking portion adapted to engage the roller and a pair of helical arms adapted to be intertwined with, and grip, the cable once the cable is in extended position. Using this clamp it is possible to mount a plurality of rollers along the intended path of the cable, draw cable over the rollers, and secure the cable to the rollers without having to remove the rollers as is conventional practice.

6 Claims, 2 Drawing Sheets

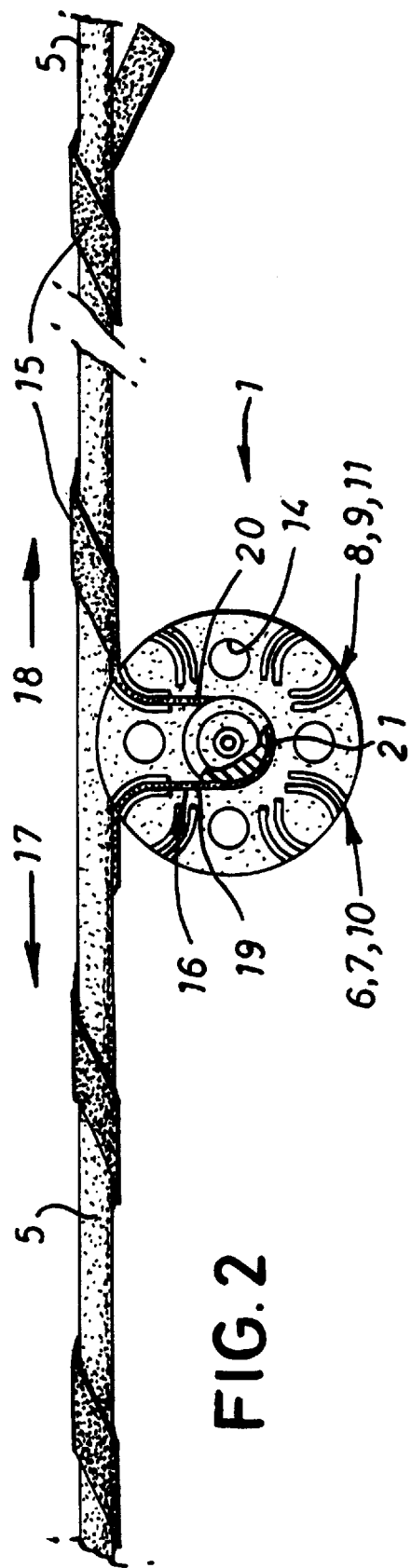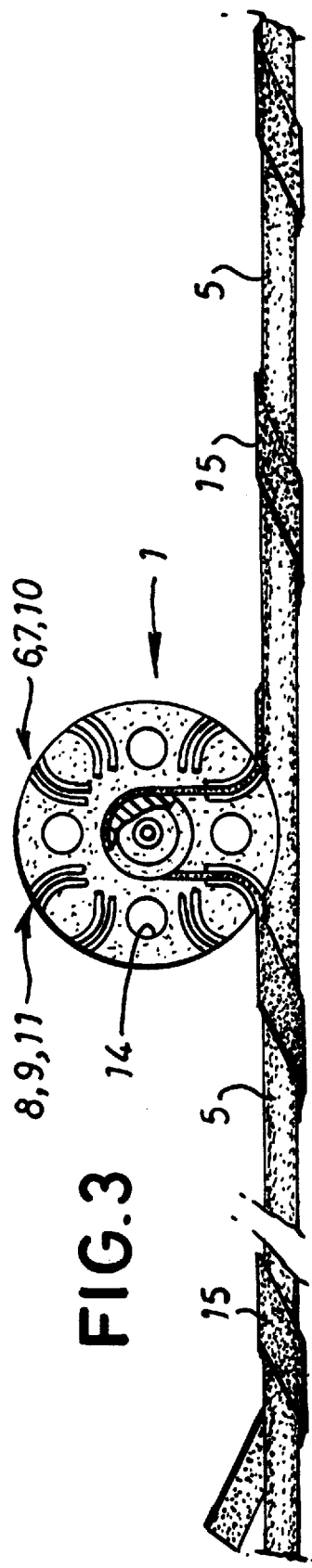

CABLES SUSPENSION DEVICES

This invention relates to devices for suspending cables and is particularly, though not exclusively, applicable to suspending optical fibre cables.

The following description is addressed to optical fibre cables but it will be clear to those in the art that other cables, such as electric or telephone cables for example, may be suspended in like manner.

Optical fibre cables come in a variety of sizes and types but a common feature of such cables is that they cannot tolerate sharp bends or crushing and so have to be handled more carefully than electric cables. In installing an overhead optical fibre line a typical requirement might be the need to run out 3–5 kilometers of cable suspended from poles at, say, 50 meter intervals. The current method of doing this is to temporarily fit a grooved running out roller to each pole, pull a length of cable over the rollers, and then at each pole remove the cable from the top groove of the running out roller to a position where it is secured in a permanent clamp. The temporary rollers are then removed and reused.

This procedure is time consuming comprising the steps (steps iii and iv not necessarily in this order) of:
 i) mounting a plurality of temporary rollers along the intended path of the overhead cable
 ii) drawing cable over the rollers
 iii) fastening permanent suspension clamps
 iv) securing the cable to the permanent suspension clamps
 v) removing the temporary rollers.

The inventor has realised that by combining the functions of roller and permanent clamp in one device significant savings in installation time may be achieved. Further, a reduction in cost is possible due to the simplicity of the resultant design of clamp.

Accordingly the present invention provides a cable suspension clamp comprising a roller capable in use of rotating as a cable is drawn across it, and securing means comprising a length of material having a central locking portion adapted to engage the roller and a pair of helical arms adapted to be intertwined with, and grip, the cable once the cable is in extended position.

By extended position is meant that the cable is at least partially unwound and in its intended final position with respect to the roller.

The roller may comprise regions adapted to form locking portions complementary to the central locking portion.

The invention further provides a method of suspending overhead cables comprising the steps of:
 i) mounting a plurality of rollers along the intended path of the overhead cable
 ii) drawing cable over the rollers
 iii) securing the cable to the rollers by a clamp comprising a length of material having a central locking portion adapted to engage the roller and a pair of helical arms the method comprising the step of intertwining the helical arms with the cable and engaging the locking portion with the roller.

Further features of the invention will become evident from the following description and the appended claims.

The invention is illustrated by way of example in the following with reference to the drawings in which:

FIG. 2 shows a cable resting on a roller and secured by a tie in accordance with the present invention FIG. 3 shows a cable lying below a roller and secured by a tie in accordance with the present invention

Roller 1 comprises a hub 2 with central aperture 3. Aperture 3 is of a size to receive a bolt or other fastening means (not shown) in such a manner that the roller may freely rotate. The bolt or other fastening means may secure directly to a post or other mounting position or may secure the roller to a base (not shown) which itself is secured to a post or other mounting position.

Figure 1:
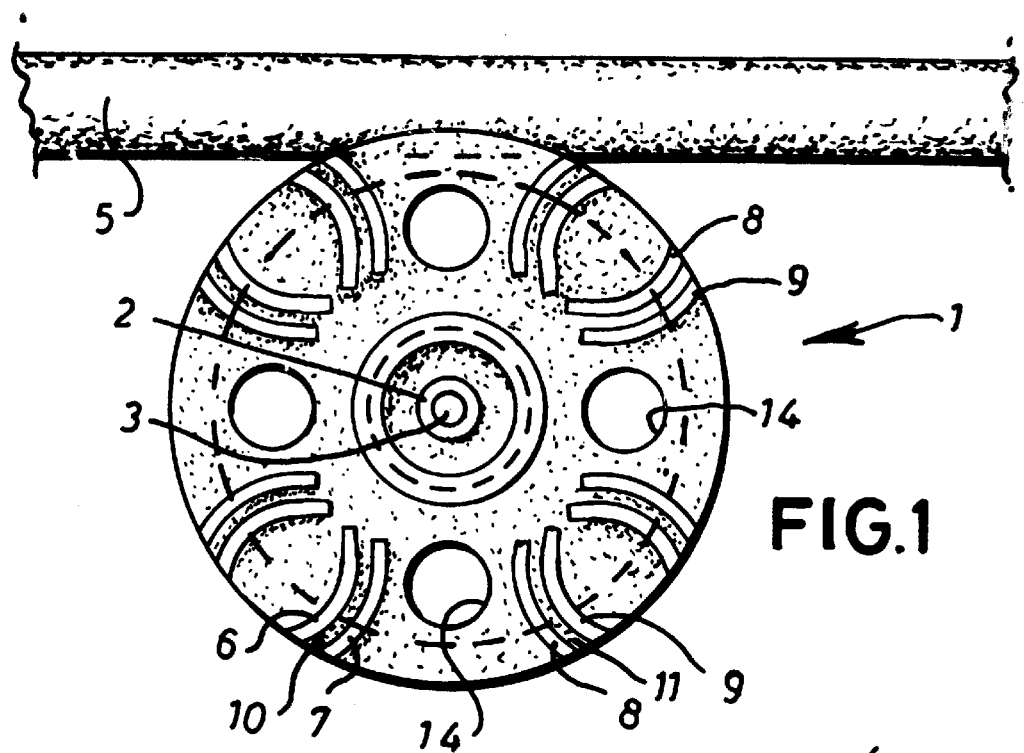
FIG. 1 shows a cable resting on a roller usable in the present invention.
Figure 4:
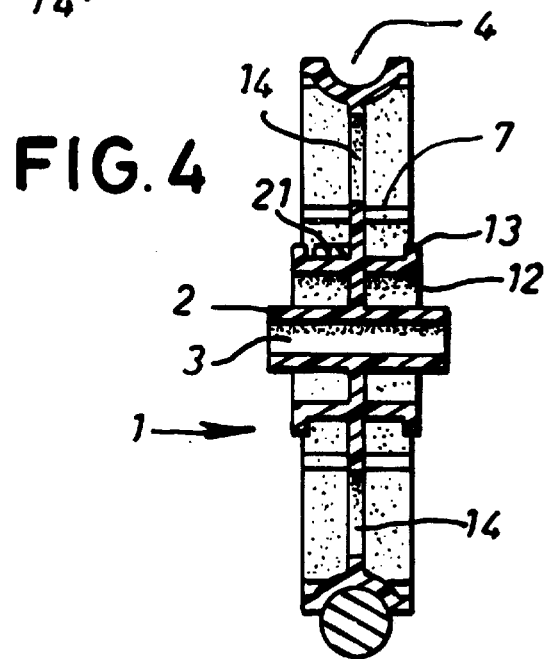
FIG. 4 is a sectional view in the direction A—A of the roller of FIG. 3.

Roller 1 has a peripheral groove 4 of a size to receive a cable 5. As shown in FIG. 1 cable 5 may be drawn over the roller 1 (which would cause rotation of the roller) and when in extended position the cable may lie upon the roller loosely held in engagement with the roller 1 by the peripheral groove 4. The peripheral groove 4 may be a simple arc section sized to accept a range of desired cable sizes.

Roller 1 has four sets of axially extending arcuate vane pairs 6–7, 8–9 each vane pair 6–7 and 8–9 defining between them arcuate channels 10, 11.

An axially extending collar 12 about the hub 2 has an outwardly facing radial lip 13.

Holes 14 serve to reduce the weight of the roller 1.

Once a cable 5 is in extended position lying above the roller 1 (as in FIG. 1) it may be secured in place either above the roller 1 (see FIG. 2) or it may, if desired, be moved below the roller 1 (see FIG. 3) and secured to the underside of the roller 1. The cable 5 is secured to the roller 1 by a tie 15 which is formed from strip material, for example steel.

Tie 15 comprises a central locking portion 16 and two helical arms 17, 18. The central locking portion 16 comprises two limbs 19, 20 joined by bend 21.

To secure the cable 5 the helical arms 17, 18 are intertwined with the cable 5. The internal diameter of each helix is chosen to be sufficiently smaller than the outer diameter of the cable that it will grip without damaging the cable. Generally it is found that if the ratio of the internal diameter of the helix to the outside diameter of the cable is less than 0.75 it is difficult, or impossible, to intertwine the cable with the helix. If the ratio is greater than 0.9 the cable tends to slip. Typically the ratio is about 0.8 to 0.85. This degree of interference provides a continuous radial gripping pressure on the cable under the tension of the cable in service. A given helix can therefore accommodate a range of cable sizes provided a sufficient degree of interference is provided.

Once engaged with the cable 5 the tie 15 can be secured to the roller 1 by aligning limbs 19, 20 of the central locking portion 16 with arcuate channels 10, 11 and snapping bend 21 of central locking portion 16 over lip 13 into engagement with collar 12.

In the engaged position limbs 19, 20 lie within arcuate channels 10, 11 securing the pulley against rotation with respect to the cable 5 and bend 21 is trapped by lip 13 preventing the tie 15 from disengaging.

Figure 5:
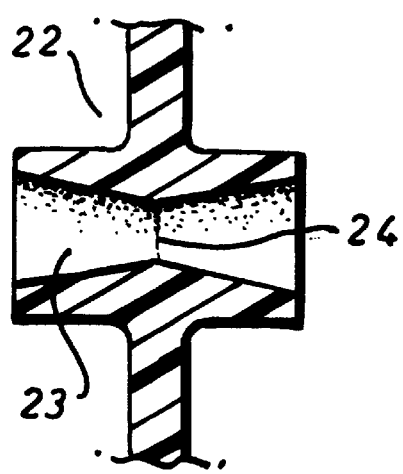
FIG. 5 is a part sectional view showing part of an alternative roller usable in the present invention.

As well as being free to rotate about the bolt or other fastening means it is preferable that the roller 1 be capable of limited tilting movement relative to the bolt or other fastening means so that if the bolt or other fastening means used to secure the roller 1 is not positioned square to the cable axis within a limited range the cable will still lie in the groove 4. Such an arrangement is illustrated in FIG. 5 which shows a part section of an alternative roller 22 having a double frusto-conical aperture 23, the cones meeting at their narrow ends to form a neck 24. Such a double frusto-conical aperture 23 will allow sufficient "play" in the alternative roller 22 that it may tilt to a limited extent and allow free rotation of the roller 1 about the bolt or other fastening means. Neck 24 of the double frusto-conical aperture 23 is sized in relation to the bolt or other fastening means such that there is little scope for side-to-side movement of the roller 22 along the cable axis so providing easy rotation of the roller 23 about the bolt or other fastening means. The frusto-conical shape is important to avoid "chatter" as the cable is drawn across it. Such chatter would arise if a simple oversized hole was used since the pulley would tend to ride up the bolt or other fastening means and drop down periodically as the cable was drawn across the roller.

For an optical cable of diameter 14 mm (the usual range of diameters lie in the range 9–18 mm) the roller 1 typically has a diameter of 140 mm and typical dimensions of the tie 15 are leg length 625 mm, helix inner diameter 11.9 mm, is helix pitch 125 mm and strip dimensions 2.5 mm thick by 9.5 mm wide.

The fastening means described above is by way of example only. Other fastening means may be devised that function in similar manner. For example the helical strip may comprise several helically formed wires (e.g. 2–4 wires) bonded to form a helical strip. The central locking portion may engage with the peripheral groove rather than with specially constructed complementary locking portions of the roller. Other forms of fastening means may be provided such as a clamp bearing on an edge of the roller to clamp the cable to the roller. It is clear that the principle of this invention is widely applicable.

I claim:

1. A cable suspension clamp comprising a roller capable in use of rotating as a cable is drawn across it, and securing means comprising a length of material having a central locking portion adapted to engage the roller and a pair of helical arms adapted to be intertwined with, and grip, the cable once the cable is in extended position, and in which the roller comprises (i) regions adapted to form locking portions complementary to the central locking portion and (ii) a peripheral groove capable of accommodating the cable as the cable is drawn across the roller.

2. A cable suspension clamp as claimed in claim 1 in which, as the cable is drawn along a cable axis across the roller, the roller is capable of limited tilting movement such that if the roller is not positioned square to the cable axis within a limited range the cable will still lie in the groove and the roller will be free to rotate as the cable is drawn across it.

3. The cable suspension clamp as claimed in claim 2 in which the roller comprises a central aperture to accommodate a bolt or other fastening means and in which the central aperture is of a double frusto-conical form having a neck.

4. A method of suspending overhead cables comprising the steps of:
   i) mounting along the intended path of the overhead cable a plurality of peripherally grooved rollers, the peripheral grooves of the rollers being capable of accommodating a cable drawn across the rollers;
   ii) drawing cable over the rollers; and
   iii) securing the cable to the rollers by a clamp comprising a length of material having a central locking portion adapted to engage one of the rollers and a pair of helical arms, the method comprising the step of intertwining the helical arms with the cable and engaging the locking portion with the roller, the central locking portion engaging with regions of the roller adapted to form locking portions complementary to the central locking portion.

5. The method of suspending overhead cables as claimed in claim 4 in which the roller, if not positioned square to the cable axis, is capable of, and undergoes, limited tilting movement such that the cable lies in the groove and the roller freely rotates as the cable is drawn across it.

6. The method of suspending overhead cables as claimed in claim 5 in which the roller comprises a central aperture to accommodate a bolt or other fastening means and in which the central aperture is of a double frusto-conical form having a neck.

* * * * *